United States Patent

Thiel et al.

[11] 3,919,226
[45] Nov. 11, 1975

[54] CERTAIN 6-PIPERAZINOALKYLAMINOPURINES

[75] Inventors: Max Thiel, Mannheim; Walter-Gunar Friebe, Darmstadt; Kurt Stach, Mannheim; Egon Roesch, Mannheim; Androniki Roesch, Mannheim, all of Germany

[73] Assignee: Boehringer Mannheim G.m.b.H., Mannheim, Germany

[22] Filed: June 12, 1974

[21] Appl. No.: 478,799

[30] Foreign Application Priority Data
July 4, 1973 Germany.................... 2334009

[52] U.S. Cl................................ 260/252; 424/253
[51] Int. Cl.²................................ C07D 473/32
[58] Field of Search ........................... 260/252

[56] References Cited
UNITED STATES PATENTS

| | | | |
|---|---|---|---|
| 3,016,378 | 1/1962 | Rock et al. | 260/252 |
| 3,457,263 | 7/1969 | Regnier et al. | 260/252 |

*Primary Examiner*—Donald G. Daus
*Assistant Examiner*—Anne Marie T. Tighe
*Attorney, Agent, or Firm*—Burgess, Dinklage & Sprung

[57] ABSTRACT

New purine compounds of the formula

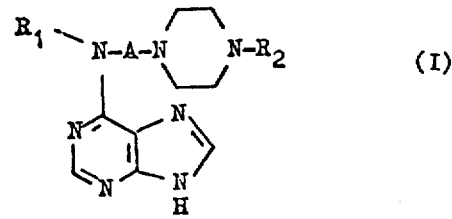

wherein $R_1$ is hydrogen or lower alkyl;

$R_2$ is phenyl or benzyl, optionally substituted by halogen, lower alkyl or lower alkoxy; and A is lower alkylene optionally substituted by a hydroxyl group;

and the pharmacologically compatible salts thereof, have outstanding anti-oedema, anti-inflammatory and anti-allergic activity.

15 Claims, No Drawings

CERTAIN 6-PIPERAZINOALKYLAMINOPURINES

The present invention is concerned with new purine compounds and therapeutic compositions and methods employing such compounds.

The new purine compounds of the invention have the formula:

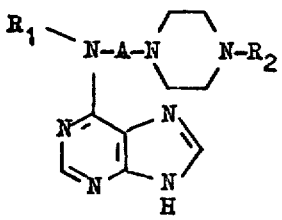

wherein
$R_1$ is hydrogen or lower alkyl;
$R_2$ is phenyl, or benzyl, optionally substituted by halogen, lower alkyl or lower alkoxy; and
A is lower alkylene optionally substituted by a hydroxyl group;
and the pharmacologically compatible salts thereof.

We have found that the new compounds of general formula (I) have an anti-oedema action and reduce capillary permeability. They can suppress the liberation and action of histamine and serotonine and thus also have an anti-inflammatory and anti-allergic action.

The new compounds according to the present invention can be prepared, for example, by reacting a piperazinyl compound of the general formula:

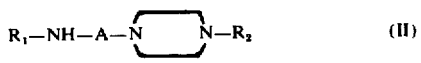

wherein
$R_1$, $R_2$ and A have the same meanings as above, with a purine derivative of the general formula

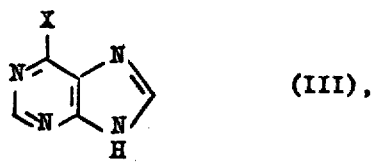

wherein X is a reactive residue, whereafter, if desired, the reaction product obtained is reacted with an acid to give the corresponding pharmacologically compatible salt.

The alkylene chain can contain 2 to 5 and preferably 2 or 3 carbon atoms. The lower alkyl and alkoxy radicals contain 1 to 5 and preferably 1 to 3 carbon atoms; they can be straight-chained or branched. The halogen substituents can be fluorine, chlorine or bromine atoms. The reactive residue X can be a halogen atom or an alkylthio or benzylthio radical.

When X is a halogen atom, the reaction is preferably carried out in a solvent, for example dioxan, at boiling temperature. When X is an alkylthio or benzylthio group, higher temperatures are needed for the reaction; it is best to use an excess of amine of general formula (II) as solvent, preferably at a temperature of 130°–150°C.

The compounds of general formulae (II) and (III) are either known compounds or can easily be prepared from known compounds by well-known methods.

The pharmacologically compatible salts can be prepared in the conventional manner, for example, by neutralization of the compounds (I) with non-toxic inorganic or organic acids, for example, hydrochloric acid, sulfuric acid, phosphoric acid, hydrobromic acid, acetic acid, lactic acid, citric acid, malic acid, salicylic acid, malonic acid, maleic acid or succinic acid.

The new compounds (I) according to the present invention and the salts thereof can be administered in liquid or solid form, enterally or parenterally. For this purpose, at least one of the new compounds (I) and/or at least one salt thereof is admixed with a solid or liquid pharmaceutical diluent or carrier. All the conventional forms of administration can hereby be used, for example, tablets, capsules, dragees, syrups, solutions, suspensions and the like. As injection medium, it is preferred to use water which contains the usual additives for injection solutions, such as stabilizing agents, solubilizing agents and buffers. Additives of this kind include, for example, tartrate and citrate buffers, ethanol, complex-forming agents (for example ethylenediamine-tetraacetic acid and the non-toxic salts thereof) and high molecular weight polymers (for example liquid polyethylene oxide) for viscosity regulation. Liquid carrier materials for injection solutions must be sterile and are preferably placed into ampoules. Solid carrier materials include, for example, starch, lactose, mannitol, methyl cellulose, talc, highly-dispersed silicic acid, high molecular weight fatty acids (for example stearic acid), gelatine, agar-agar, calcium phosphate, magnesium stearate, animal and vegetable fats and solid high molecular weight polymers (for example polyethylene glycols); compositions suitable for oral administration can, if desired, contain flavoring and/or sweetening agents.

The following Examples are given for the purpose of illustrating the present invention.

EXAMPLE 1

Preparation of
6-[2-(4-Phenyl-piperazino)-ethylamino]-purine

A solution of 6.16 g (0.03 mol) 2-(4-phenyl-piperazino)-ethylamine in 25 ml. anhydrous dioxan was added to 4.62 g. (0.03 mol) 6-chloropurine and 6.06 g. (0.06 mol) triethylamine in 75 ml. anhydrous dioxan and the reaction mixture was heated under reflux for 5 hours. After standing for 15 hours at ambient temperature, the precipitate obtained was filtered off with suction and washed with water and ether. There were obtained 8.30 g. (85.6% of theory) of crude product with a melting point of 218°–221°C. After recrystallization from ethanol, there were obtained 7.70 g. (79.5% of theory) 6-[2-(4-phenyl-piperazino)-ethylamino]-purine, which melted at 219°–221°C.

The following compounds were prepared in an analogous manner:

6-{2-[4-(2-chlorophenyl)-piperazino]-ethylamino}-purine from 6-chloropurine and 2-[4-(2-chlorophenyl)-piperazino]-ethylamine; yield 47% of theory; m.p. 186°–187°C., after recrystallization from ethanol;

6-[3-(4-phenyl-piperazino)-propylamino]-purine from 6-chloropurine and 3-(4-phenyl-piperazino)-propylamine; yield 62% of theory; m.p. 212°–214°C., after recrystallization from ethanol;

6-{3-[4-(2-chlorophenyl)-piperazino]-propylamino}-purine from 6-chloropurine and 3-[4-(2-chlorophenyl)-piperazino]-propylamine; yield 77% of theory; m.p. 193°–194°C.; after recrystallization from ethyl acetate;

6-{3-[4-(2-methylphenyl)-piperazino]-propylamino}-purine from 6-chloropurine and 3-[4-(2-methylphenyl)-piperazino]-propylamine; yield 49% of theory; m.p. 183°–184°C., after recrystallization from ethanol;

6-{3-[4-(2-methoxyphenyl)-piperazino]-propylamino}-purine from 6-chloropurine and 3-[4-(2-methoxyphenyl)-piperazino]-propylamine; yield 78% of theory; m.p. 194°–195°C., after recrystallization from ethyl acetate;

6-{3-[4-(3-chlorophenyl)-piperazino]-propylamino}-purine from 6-chloropurine and 3-[4-(3-chlorophenyl)-piperazino]-propylamine; yield 45.5% of theory; m.p. 208°–209°C., after recrystallization from isopropanol;

6-{3-[4-(4-ethylphenyl)-piperazino]-propylamino}-purine from 6-chloropurine and 3-[4-(4-ethylphenyl)-piperazino]-propylamine; yield 62% of theory; m.p. 209°–211°C., after recrystallization from isopropanol;

6-{3-[4-(4-chlorobenzyl)-piperazino]-propylamino}-purine from 6-chloropurine and 3-[4-(4-chlorobenzyl)-piperazino]-propylamine; yield 40% of theory; m.p. 158°–159°C., after recrystallization from ethyl acetate;

6-[N-ethyl-N-3-(4-phenylpiperazino)-propylamino]-purine from 6-chloropurine and N-ethyl-N-3-(4-phenylpiperazino)-propylamine; yield 66% of theory; m.p. 155°–156°C., after recrystallization from ethanol;

6-[2-hydroxy-3-(4-phenylpiperazino)-propylamino]-purine from 6-chloropurine and 2-hydroxy-3-(4-phenylpiperazino)-propylamine; yield 60% of theory; m.p. 220°–221°C., after recrystallization from ethanol;

6-{3-[4-(4-isopropoxyphenyl)-piperazino]-propylamino}-purine from 6-chloropurine and 3-[4-(4-isopropoxyphenyl)-piperazino]-propylamine; yield 60% of theory; m.p. 228°C., after recrystallization from isopropanol;

6-{3-[4-(4-bromophenyl)-piperazino]-propylamino}-purine from 6-chloropurine and 3-[4-(4-bromophenyl)-piperazino]-propylamine; yield 76% of theory; m.p. 254°–255°C., after recrystallization from dimethyl formamide;

6-{3-[4-(4-isopropylphenyl)-piperazino]-propylamino}-purine from 6-chloropurine and 3-[4-(4-isopropylphenyl)-piperazino]-propylamine; yield 67% of theory; m.p. 224°–225°C., after recrystallization from isopropanol;

6-{3-[4-(3-bromophenyl)-piperazino]-propylamino}-purine from 6-chloropurine and 3-[4-(3-bromophenyl)-piperazino]-propylamine; yield 83% of theory; m.p. 212°–213°C., after recrystallization from methanol;

6-{3-[4-(4-bromobenzyl)-piperazino]-propylamino}-purine from 6-chloropurine and 3-[4-(4-bromobenzyl)-piperazino]-propylamine; yield 79% of theory; m.p. 164°C., after recrystallization from ethyl acetate;

EXAMPLE 2

Preparation of 6-[N-Methyl-N-3-(4-phenyl-piperazino)-propylamino]-purine 3.32 g. (0.02 mol) 6-methylthiopurine and 11.65 g. (0.05 mol) N-methyl-N-3-(4-phenyl-piperazino)-propylamine were heated for 16 hours at 140°C. in a bomb tube. After cooling, excess amine was washed out from the reaction mixture with ether and the solid residue was recrystallized from ethanol. There were obtained 7.50 g. (71% of theory) 6-[N-methyl-N-3-(4-phenyl-piperazino)-propylamino]-purine; m.p. 201°–202°C.

The new compounds of this invention have anti-edematous activity and reduce capillary permeability. They can suppress the liberation, or the activity, of histamine and serotonin and, thus, also have an anti-inflammatory and anti-allergic action.

A substance commercially available under the trademark "Diethylcarbamazine", i.e., 1-diethylcarbamoyl-4-methyl-piperazine, was used as a comparison compound. It is known that this compound inhibits the mast cell degranulation, i.e. has an antiallergic action.

The inhibition of mast cell degranulation in rats caused by the intraperitoneal injection of dextran was used as the test method for comparison of the substances set forth in the Table below (see Fügner, Experientia 29, 708 (1973) and Orr et al., Immunology, 19, 469 (1970)).

Dextran (average molecular weight 60,000, in 6% solution) was injected into rats at 300 mg/kg. i.p. immediately after the test compound was injected intravenously. After 15 minutes subsequent to the Dextran injection, the animals were killed through a blow to the neck and exsanguinated. For the fixation of the mast cells in situ a formaline-alcohol solution (1:10) was subsequently administered i.p. This solution was permitted to take effect for 5 minutes, the abdominal cavity was opened and two to three small pieces of rat mesenteron were removed. These were washed with 0.9% NaCl solution and then dyed for five minutes in toluidine-blue-solution (1 ml toluidine-blue 0.1% and 7.5 l 0.9% NaCl solution). After washing with 0.9% NaCl solution, the mesenteron pieces were spread out on a slide. 200 Mast cells were counted and the number of the degranulated cells determined (expressed in % of the total cells), and stated as "MD" (mast cell degranulation).

As a control, in each test two animals were treated with a sodium chloride solution instead of Dextran i.p.; in these control animals there was found an average of 5–6% of degranulated mast cells.

The results are set forth in the following Table.

TABLE

| Test Compound | Dosage mg/kg | % Inhibition of MD* |
|---|---|---|
| Diethylcarbamazine | 30 | 16 |
| | 60 | 28 |
| 6-{2-[4-(2-Chlorophenyl)-piperazino]-ethylamine}-purine | 3 | 20 |
| | 6 | 46 |
| 6-{3-[4-(2-Methoxyphenyl)-piperazino]-propylamino}-purine | 3 | 34 |
| | 6 | 46 |
| 6-{3-[4-(3-Chlorophenyl)-piperazino]-propylamino}-purine | 6 | 23 |
| 6-[3-(4-Phenyl-piperazino)-propylamino]-purine | 6 | 14 |

*all values are statistically significant relative to control (probability <0.01).

As shown in the above table, the new compounds have a 5–10 times better activity than the known compound "Diethylcarbamazine".

The instant compounds make possible comprehensive therapy of acute as well as chronic phlebological and capillary afflictions as well as varicose syndromes. The instant compounds retard reactions leading to edemas and swellings, including those of allergic origin. The typical daily dosage of 10 to 300 mg results in reducing or eliminating the above afflictions, commonly within some days. A preferred dosage is 30–100 mg.

It will be understood that the specification and examples are illustrative but not limitative of the present invention and that other embodiments within the spirit and scope of the invention will suggest themselves to those skilled in the art.

What is claimed is:

1. Purine compound of the formula

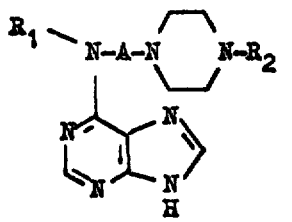

(I)

wherein $R_1$ is hydrogen or lower alkyl;

$R_2$ is phenyl, benzyl, mono substituted phenyl or mono substituted benzyl wherein the substituent is selected from halogen, lower alkyl and lower alkoxy; and A is lower alkylene or hydroxyloweralkylene.

2. Purine compound as claimed in claim 1 wherein $R_1$ is hydrogen.

3. Purine compound as claimed in claim 1 wherein $R_1$ is alkyl of up to 5 carbon atoms.

4. Purine compound as claimed in claim 1 wherein $R_2$ is phenyl.

5. Purine compound as claimed in claim 1 wherein $R_2$ is halophenyl.

6. Purine compound as claimed in claim 1 wherein $R_2$ is benzyl.

7. Purine compound as claimed in claim 1 wherein $R_2$ is halobenzyl.

8. Purine compound as claimed in claim 1 wherein $R_2$ is phenyl or benzyl substituted by alkyl of up to 5 carbon atoms.

9. Purine compound as claimed in claim 1 wherein $R_2$ is phenyl or benzyl substituted by alkoxy of up to 5 carbon atoms.

10. Purine compound as claimed in claim 1 wherein A is alkylene of 2 to 5 carbon atoms.

11. Purine compound as claimed in claim 1 wherein A is hydroxyalkylene of 2 to 5 carbon atoms.

12. Purine compound as claimed in claim 1 designated 6-{2-[4-(2-chlorophenyl)-piperazino]-ethylamino}-purine.

13. Purine compound as claimed in claim 1 designated 6-{3-[4-(2-methoxyphenyl)-piperazino]-propylamino}-purine.

14. Purine compound as claimed in claim 1 designated 6-{3-[4-(3-chlorophenyl)-piperazino]-propylamino}-purine.

15. Purine compound as claimed in claim 1 designated 6-[3-(4-phenyl-piperazino)-propylamino]-purine.

* * * * *